(12) United States Patent
Costanzi

(10) Patent No.: US 7,619,022 B2
(45) Date of Patent: Nov. 17, 2009

(54) FLAME RETARDANT POLYMERIC COMPOSITIONS

(75) Inventor: Silvestro Costanzi, Genoa (IT)

(73) Assignee: Italmatch Chemicals S.p.A., Genoa (IT)

( * ) Notice: Subject to any disclaimer, the term of this patent is extended or adjusted under 35 U.S.C. 154(b) by 0 days.

(21) Appl. No.: 11/995,688

(22) PCT Filed: Jul. 22, 2005

(86) PCT No.: PCT/IB2005/002147

§ 371 (c)(1),
(2), (4) Date: Feb. 6, 2008

(87) PCT Pub. No.: WO2007/010318

PCT Pub. Date: Jan. 25, 2007

(65) Prior Publication Data

US 2008/0214715 A1    Sep. 4, 2008

(51) Int. Cl.
*C08K 3/32* (2006.01)
*C08K 3/00* (2006.01)
(52) U.S. Cl. ....................... 524/414; 524/411
(58) Field of Classification Search ................. 524/414, 524/411
See application file for complete search history.

(56) References Cited

U.S. PATENT DOCUMENTS

| | | | |
|---|---|---|---|
| 3,833,537 A | | 9/1974 | Jacquiss |
| 4,563,496 A | | 1/1986 | Lindner |
| 4,833,186 A | * | 5/1989 | Bertelli et al. ............... 524/100 |
| 5,256,718 A | * | 10/1993 | Yamamoto et al. .......... 524/411 |
| 2007/0082995 A1 | * | 4/2007 | Costanzi et al. ............. 524/414 |

FOREIGN PATENT DOCUMENTS

| | | |
|---|---|---|
| EP | 0442465 A | 8/1991 |
| WO | WO2005/044906 A | 5/2005 |

* cited by examiner

*Primary Examiner*—Ling-Siu Choi
*Assistant Examiner*—Hui Chin
(74) *Attorney, Agent, or Firm*—Hess Patent Law Firm, PC; Robert J. Hess

(57) ABSTRACT

The present invention provides flame retardant thermoplastic moulding compositions comprising:
A) from 65% to 99.5% by weight (with respect of the total weight of the final composition) of a polyolefinic polymer particularly selected among polypropylene polymers;
B) from 0.1% to 30% by weight (with respect of the total weight of the final composition) of a synergic mixture of an hypophosphorous acid metal salt and halogenated organic compounds;
C) from 0.5% to 10% by weight (with respect of the total weight of the final composition) of a plurality of selected additives consisting of processing aids, heat and process stabilizers, UV stabilizers, antidripping agents (PTFE—Polytetrafluoroethylene), pigments, mould releasing agents, nucleating agents;
D) from 0% to 50% by weight (with respect of the total weight of the final composition) of an inorganic filler.

The total of the percentages by weight of components A to D is 100%.

24 Claims, No Drawings

FLAME RETARDANT POLYMERIC COMPOSITIONS

SUBJECT OF THE INVENTION

The invention relates to flame retarded thermoplastic moulding compositions selected in particular from olefinic polymers, a process for their preparation and their use in the preparation of flame retarded polyolefinic articles.

BACKGROUND OF THE INVENTION

It has well known that polyolefinic polymers are particularly sensitive to the ignition with flame; therefore they need a suitable protection especially for critical applications such as part of household electric appliances, construction materials, and interior decorative materials.

For these applications several studies to impart satisfactory fire resistance have been carried out.

For example, Japanese patents 53-92855, 54-29350, 54-77658, 56-26954, 57-87482, 60-110738 disclose a method for preparing flame retardant polypropylene resin compositions by using inorganic flame retardant additive like Magnesium hydroxide, aluminium hydroxide, hydrotalcite or the like.

All these additives, however, in order to be effective need to be added at a level higher than 50% (by weight) based on the weight of final composition with the result that the processability is bad and the mechanical properties are drastically deteriorated.

Also well known are flame retardant polymeric compositions based on halogenated (brominated or chlorinated) organic products such as those disclosed, for example, in Japanese patents 55-30739 and 8-302102. JP 8-302102 relates to a flame retardant polypropylene resin composition where the polymer is mixed with 8-15 wt % of an organo-halogen compound (flame retardant A) and 1-3 wt % of an halogenated epoxy oligomer (flame retardant B) as well as with other additives, for example antimony trioxide. These additives have been recognised to be very effective for ranking both V2 and V0 flammability grade, according to the UL 94 standards, but they normally cause the corrosion of the equipment used for processing due to the emission of acids and will develop toxic fumes in case of fire. In addition, the corresponding polymeric articles show high blooming and are endued with poor weather resistance.

It has been also known that flame retarded polypropylene articles can be achieved with the use of an intumescent system based on two or three components comprising:
- an acid component, generally phosphorus containing agent;
- a foaming agent, generally a nitrogen containing product such as for example ammonium polyphosphate, melamine or the like;
- a carbonific compound which is generally a sugar like product as for example mono-, di-, tri-pentaerythritol or tris (2-hydroxyethyl) isocyanurate (THEIC).

U.S. Pat. No. 4,312,805 discloses self-extinguishing polymer compositions comprising an ammonium or amine phosphate and one or more nitrogen organic compound, while U.S. Pat. No. 4,253,972 discloses flame retardant polyolefin compositions comprising a pentate salt of an amino-s-triazine and a polyhydric alcohol. U.S. Pat. No. 4,198,493; U.S. Pat. No. 5,312,853; U.S. Pat. No. 4,727,102; U.S. Pat. No. 3,810,862; U.S. Pat. No. 4,198,493; WO 2004 063262 also disclose similar polymer compositions.

In all cases the additivation level of such flame retardant systems is normally in the range of from 25% to 35% wt on the weight of total compound and therefore the mechanical properties, the weather resistance and the aesthetic properties of corresponding polymer articles are not satisfactory.

WO 2005 019330, discloses a particular system suitable for ranking V2 in polypropylene homopolymer articles. The disclosed flame retardant polymeric composition has a low halogen content and comprises, as essential components:
- a nitrogen containing compound such as a triazine or a mixture of triazines of general formula (I)
- an halogen containing compound
- a bismuth compound of formula $Bi_zA_w$
- a compound selected from the group consisting of red phosphorus, a phosphorous compound and an organic compound In the described system, the halogen can be brought either by the nitrogen containing product, generally a melamine based material, or by the Bismuth salt or by both and the total halogen in the composition is quite low.

This interesting composition has been reported to be effective in unfilled homo-polypropylene only and even so it is not fully satisfactory because of the discoloration of polymer articles due to the negative interaction of components. In addition, it has to be noted that the bismuth compound, which is essential in the above cited prior art composition, might cause severe environmental problems (La medicina Biologica, October-December 2001—A.M:Pasciuto—XVI national meeting—Milan Feb. 6, 2001—Rome Sep. 6, 2001).

OBJECT OF THE INVENTION

It is an object of the present invention to provide flame retarded thermoplastic moulding compositions and articles based on polypropylene resins having good mechanical properties, good weather resistance along with good flame retardant grade.

Another object of the present invention is to provide moulding compositions and articles based on filled polyolefinic resins characterised by satisfactory flame retardant properties.

Another object of the invention is to provide flame retarded polyolefinic articles with a very low halogen concentration level, hardly detectable with the usual analytical methods.

Still another object of the present invention is to provide a process for the preparation of flame retarded moulding compositions and articles based on polyolefinic resins.

Again object of the present invention is to provide flame-retarded thermoplastic moulding compositions to be used in the preparation of flame retarded polymer articles.

DETAILED DESCRIPTION OF THE INVENTION

The invention relates to polymeric compositions having improved flame resistance.

It has been surprisingly found that the objects of the present invention are satisfied with thermoplastic moulding compositions and moulded articles based on said polymeric composition which comprise at least a combination of a hypophosphorous acid metal salt and an halogen containing compound. According to the present invention, the flame retardant thermoplastic moulding composition comprises:
- A. from 65% to 99.5% by weight of a polyolefinic polymer especially selected among polypropylene polymers;
- B. from 0.1% to 35% by weight of a synergistic mixture of an hypophosphorous acid metal salt and an halogenated organic compounds;

C. from 0.5% to 10% by weight of a plurality of selected additives comprising processing aids, heat and process stabilisers, UV stabilisers, antidripping agents (PTFE—Polytetrafluoroethylene), pigments, mould releasing agents, nucleating agents;

D. from 0% to 50% by weight of an inorganic filler.

The total of the percentages by weight of components A to D is 100%.

Said hypophosphorous acid metal salt is selected, according to the present invention, among aluminium or calcium hypophosphite.

Such polymeric compositions are based on thermoplastic polymers, such as polyolefins, particularly selected as polypropylene.

In the meaning of the invention a polyolefinic resin is any polymer derived from a variety of monomers especially propylene, ethylene, butene, isobutene, pentene, hexene, heptene, octene, 2-methyl propene, 2-methylbutene, 4-methyl pentene, 4-methyl hexene, 5-methylhexene, butadiene, pentadiene, hexadiene, isoprene, 2,3-dimethylbutadiene, vinyl ciclohexene, cyclopentadiene, styrene, and methyl styrene.

The polyolefin resins include also copolymers produced from any of the above mentioned monomers and the like and further include copolymers which contain an olefinic carboxylic acid or anhydride or ester like for example acrylic acid, maleic anhydride, vinyl acetate.

At last polyolefin resins include homopolymer blends, copolymer blends and homopolymer-copolymer blends.

The preferred polyolefins are polypropylene including atactic-, syndiotactic- and isotactic-polypropylene, polyethylene including low density, high density, linear low density and block and random copolymers of ethylene and propylene. All these polymers may be produced through a variety of catalytic processes well known by the skilled of the art including the Ziegler/Natta and the metallocene catalysed processes.

The polymers may have a wide range of melt flow index (MFI) but typically they have values ranging from 1 to 50 g/10 min.

The flame retardant moulding compositions according to the present invention comprises as flame retardant system from 0.1% to 35% by weight on weight of moulding composition, preferably from 0.5% to 25% by weight, of a mixture based on hypophosphorous acid metal salts and halogen containing compounds.

The hypophosphorus acid metal salt can be any product with the following chemical formula:

$(PH_2O_2)_n Me$ where:

n is an integer number ranging from 1 to 4 in dependence of the valence of the metal Me, Me is any atom belonging to the groups I, II, III and IV of the periodic table of the elements but the preferred products are the commercially available hypophosphorous acid salts of sodium, calcium, magnesium, zinc, tin and aluminium, being the most preferred calcium hypophosphite and aluminium hypophosphite.

In the meaning of the present invention, the halogenated compound can be any organic or inorganic product which contain one or more bromine or chlorine atoms, however the preferred products are the brominated and chlorinated organic compounds widely used as flame retardant agents for organic polymers with particular regard to the commercially available ones generally used for flame retarding polyolefinic resins such as for example: decabromo diphenyl oxide, hexabromocyclododecane, ethylene bistetrabromophthalimide, tris (tribromoneopentyl) phosphate, adducts of hexachloropentadiene and cyclo octadiene, the most preferred being tetrabromo bis phenol A bis(2,3-dibromopropyl ether).

Melamine hydrobromide may also be utilised as halogenated compound within the meaning of the present invention.

The weight ratio of hypophosphorous acid metal salt on halogenated compound depends on the chemical nature of the used products, however it can range from 6 to 1/6, more preferably it can range from 3 to 1/3.

Even if it is advisable that the content of the halogenated product in the polymeric article results to be as lowest as possible, according to the present invention the halogen content in the final article should be higher than 500 ppm, because polymeric mixtures which contain less than 500 ppm of halogen do not show satisfactory flame retardant properties.

The hypophosphorous acid metal salts appear as white solid powder which does not melt under the usual processing temperatures of polymers, therefore it is advisable that the average particle size (D50%) of the powder is lower than 40 μm and the highest particle size is below 100 μm, more preferably D50% should be below 15 μm and the highest particle size is below 30 μm. The thermoplastic compositions according to the above develop good flame retardant performances and do not affect the mechanical and thermal properties of final polymer articles.

Novel thermoplastic moulding compositions of the present invention may also contain organic compounds which are in a position to form free radicals during flaming. Said organic compounds, which enable a reduction of the flame retardant composition, can be for example selected among one or more of the following products: 2,3-dimethyl 2,3-diphenyl butane, 2,3-dimethyl 2,3-diphenylhexane, poly(1,4-diisopropyl benzene). These products are generally used in an amount of between 0.01% to 1% w on the weight of total compound preferably between 0.05% and 0.5% wt.

Still the novel thermoplastic moulded composition may contain a plurality of conventional products selected among the groups of heat stabilisers, UV stabilisers, lubricants, mould releasing agents, colorants, antidripping agents, nucleating agents, antiacid components, etc. more in particular said additives, used as such or in mixture, may be present in a amount ranging from 0.5% to 10% w on the weight of final articles.

Examples of heat stabilisers are sterically hindered phenols and/or aromatic phosphites or phosphonites and/or thioesters, to be used alone or in combination and in concentration of up to 1% weight on the weight of compound.

UV stabilisers which are usually added in an amount of up to 2% weight on the weight of polymer composition are various benzotriazols, benzophenones and hindered amines derivatives.

As lubricants and mould releasing agents are preferably long chain fatty acid, like stearic acid, or fatty acid salts, like sodium, calcium or zinc stearate, or montan waxes, or one ester or amide obtained by reacting saturated aliphatic carboxylic acids having from 10 to 40 carbon atoms, preferably from 16 to 22 carbon atoms, with saturated aliphatic alcohols or amines having from 2 to 40 carbon atoms, preferably from 2 to 6 carbon atoms. Such products are used in an amount of up to 1% wt on the weight of polymeric composition with the purposes to reduce the shear stresses induced by the mechanical devices on the organic polymers and to enhance the dispersion of the inorganic materials in the polymer matrix.

Among colorants the preferred products are the inorganic pigments like, for example, titanium dioxide, iron oxide, carbon black but can be also be used other organic pigments like, but not limited to, phthalocyanines, quinacridones, perylene, nigrosine, anthraquinones.

The moulding composition according to the invention may also comprise from 0 to 1% by weight of fluorine-containing ethylene polymers, which exhibit a resin melt dropping preventing effect when the composition is fired.

Examples of these fluorine-containing ethylene are: polytetrafluoroethylene (PTFE) or tetrafluoroethylene-hexafluoropropylene copolymers available in the market with Algoflon™.

Particularly preferred are those fluorine containing polymers with particle size from 0.1 µm to 10 µm.

The flame retardant moulding composition according to the present invention may further contain one or more anti-acid components and nucleating agents selected among the groups of hydrotalcites, zinc oxide, zinc borate, magnesium carbonate, zinc stannate, sodium benzoate, benzylidene sorbitol, organo phosphate salts or similar products. Among the above products, Zinc borate and benzylidene sorbitol are the preferred ones as they improve the flame retardant performances of the composition.

The thermoplastic moulding composition of the present invention may optionally comprise a filler.

In the meaning of the present invention, filler can be any fibrous or particulate substance acting as reinforcement agent.

Example of preferred fibrous fillers are carbon fibers, aramid fibers and, preferably, glass fibers to be used in the commercial available form of chopped glass.

In order to improve the compatibility with thermoplastic resins, the fibrous fillers may previously have been surface treated with a silane compound.

When used the fibrous fillers, their amount should range from 10% to 50%, preferably from 20% to 35% by weight on the weight of the resin: if the amount is lower than 10%, no advantage is observed in the mechanical properties and if the amount is higher than 35% by weight, the viscosity of the composition will be too high.

Example of particulate substances are glass beads, amorphous silica, chalk, mica, calcinated kaolin, wollastonite, talc, magnesium carbonate, barium sulfate or similar products and they may have been surface treated with fatty acids or the like or may have been milled in presence of fatty acids or the like.

Any particulate substance available into the market as an additive for thermoplastic resin is suitable for the use in the composition provided that the average size of the granules is in the range from 2 µm to 20 µm.

When used, the amount of the particulate substance to be added to the resin composition is up to 30%, preferably up to 20% by weight on the weight of resin. If the amount of particulate substance is higher than 30% the melt viscosity of the composition will be too high and the moldability of the resin composition will be poor.

Always according to the present invention, the above products can also be used in mixture.

Methods for preparing the resin compositions according to the invention are known per se by mixing and kneading the starting components in the predetermined ratio as above reported.

Mixing and kneading operations may be effected in any well known device like banbury mixers, single screw extruders or twin screw extruders and then extruding them.

It is also possible to premix the starting components with thermoplastic resins in order to prepare masterbatches which may contain the individual components or whole additives in a predetermined ratio then dilute them with additional polymer in an extruder device for producing pellets.

The temperatures at which the components are kneaded are generally between 160° C. and 230° C. depending on the chemical nature of the used polymer.

The extrudates are cooled and pelletised.

The resulting pellets may be moulded into various moldings through injection moulding devices, blow moulding or injection compression moulding.

The moulding compositions according to the present invention are, for example, suitable for applications in the electrical and electronic sectors such as parts for office automation appliances, lamp parts, plugs and multipoint connectors, relay housings, and in building and construction applications such as pipes.

The invention is described in more detail with reference to the following examples which, however are not intended to restrict the scope of the invention Examples The components reported in the tables below are compounded in a twin screw extruder set at temperature between 160° c. and 230° C. depending on the chemical nature of the used polymer. After pelletisation and drying the pellets were injection moulded into test specimens intended to be used for the flammability test in accordance to the Underwriters Laboratories Standards, in particular to the test UL 94 which prescribes:

the conditioning of 5 specimens (each formulation and thickness) at 23° C. and 50% of relative humidity;

the positioning of each individual conditioned specimen in vertical position at about 20 cm from a below cotton flock;

2 applications of flame for each specimen (the second application starts as soon as the specimen ignited by the first application extinguishes).

The UL 94 results have been reported in accordance with the following meaning also prescribed by the standard:

V0: when the 5 tested specimens have got total afterburning time no longer than 50 sec, less than 10 sec each application of the flame, and no burning drops are allowed.

V1: when the 5 tested specimens have got total burning time less than 150 sec, less than 30 sec each application of the flame and no flaming drops are allowed.

V2: when the 5 tested specimens have got total afterburning time of less than 150 sec, less than 30 sec each application of the flame and flaming drops are allowed.

When the test results do not meet the above V0, V1 and V2 criteria, no classification (nc) has been marked in the below tables.

In the following examples the indicated materials were used as started components:

Resins:

PP (homo): Moplen HP 500N, commercialised by Basell and endued with a MFI of from 12 to 15 g/10 min;

PP (Copo): Moplen EP 340 M, commercialised by Basell and endued of a MFI of from 8 to 10 g/10 min;

PP 30% glass filled: Rialglass H 07 S30G, commercialised by Rialti;

PP 20% talc filled: Rialfill H 07 20TO, commercialised by Rialti.

Flame Retardant Additives:

Phoslite IP-A (Aluminium hypophosphite) manufactured by Italmatch Chemicals Spa. The used powder has got an average particle size (d50%) of 5 μm and d 98% below 15 μm;

Phoslite IP-C (Calcium Hypophosphite) manufactured by Italmatch Chemicals Spa. The used powder has got an average particle size of 5 μm and d 98% below 15 μm;

Melagard MC 25 (Melamine cyanurate) white powder, endued with an average particle size of about 3 μm;

Melamine hydrobromide (MB 92 G) commercialized by Domus; the solid powder has got an average particle size (d50%) of 5 μm;

Tetrabromobisphenol A bis (2,3-dibromopropyl ether) (PE 68™) commercialized by Great Lakes Chem.;

Tris (tribromo neopentyl) phosphate (Reoflam PB 370 ™) commercialized by FMC;

2,3-dimethyl 2,3-diphenylbutane (Perkadox 370™) commercialized by Akzo.

Results

The results reported in Table 1 have been obtained utilising, as flame retardant additives, the hypophosphorous acid metal salt but not the halogen containing compound. In some cases (see formulations 11-14) instead of the halogen containing compound, a nitrogen containing compound has been utilised in quite low amounts. In some formulations (7-14) an additional organic compound, able to form free radicals during flaming, has been added. In all the cases, no flame retardant properties have been detected. The above results show that hypophosphorous acid metal salts with the nitrogen containing compound, as sole additives as well as in combination with free-radical forming compounds, are not effective at all as flame retardant agents.

TABLE 2

Flame retardant effectiveness of hypophosphites/melamine cyanurate mixtures in unfilled PP (homo)

| formulations | 1 | 2 | 3 | 4 | 5 | 6 | 7 |
|---|---|---|---|---|---|---|---|
| PP (homo) (%) | 98.9 | 98.9 | 94.9 | 94.9 | 90 | 80 | 70 |
| Phoslite IP-C(%) | 0.5 | | | 3.4 | 5 | 10 | 15 |
| Phoslite IP-A(%) | | 0.5 | 3.4 | | | | |
| Perkadox 30(%) | 0.1 | 0.1 | 0.1 | 0.1 | | | |
| Melam. cyanurate (%) | 0.5 | 0.5 | 1.6 | 1.6 | 5 | 10 | 15 |
| UL 94 (3.2 mm) | nc | nc | nc | nc | nc | V2 | V0 |
| UL 94 (1.6 mm) | nc | nc | nc | nc | nc | V2 | V2 | nc = not classified according to UL 94 test

The results reported in Table 2 have been obtained utilising, as flame retardant additives, the hypophosphorous acid metal salt but not the halogen containing compound. In all cases instead of the halogen containing compound, a nitrogen containing compound has been utilised, in quite low amounts (formulations 1-5) as well as in high amount (formulations 6-7). In some formulations (1-4) an additional organic compound, able to form free radicals during flaming, has been added.

As it can be seen, those formulations comprising the above indicated products and used in combination with melamine cyanurate, are effective at very high concentration only (table 2, formulations 6 and 7).

Therefore the Nitrogen containing products alone, cannot be considered as essential components according to the scope of the present invention.

TABLE 1

Flame retardant effectiveness of hypophosphites in unfilled PP (homo)

| formulations | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| PP (homo) (%) | 99 | 98 | 94 | 99 | 98 | 94 | 97.9 | 93.9 | 97.9 | 93.9 | 96.9 | 93.9 | 93.9 | 95.9 |
| Phoslite IP-C (%) | 1 | 2 | 6 | | | | 2 | 6 | | | 2 | 4 | 2 | 2 |
| Phoslite IP-A (%) | | | | 1 | 2 | 6 | | | 2 | 6 | | | | |
| Perkadox 30 (%) | | | | | | | 0.1 | 0.1 | 0.1 | 0.1 | 0.1 | 0.1 | 0.1 | 0.1 |
| Melam. cyanurate (%) | | | | | | | | | | | 1 | 2 | 4 | 2 |
| UL 94 (3.2 mm) | nc | nc | nc | nc | nc | nc | nc | nc | nc | nc | nc | nc | nc | nc |
| UL 94 (1.6 mm) | nc | nc | nc | nc | nc | nc | nc | nc | nc | nc | nc | nc | nc | nc |

Notes:
nc = not classified according to UL 94 test

TABLE 3

Flame retardant effectiveness of Phoslite IP-C/melamine hydrobromide in unfilled PP (homo)

| formulations | 1 | 2 | 3 | 4 | 5 | 6 | 7 | 8 | 9 | 10 | 11 |
|---|---|---|---|---|---|---|---|---|---|---|---|
| PP (homo) (%) | 99.3 | 98.9 | 97.9 | 95.9 | 90.9 | 96.9 | 99 | 96.9 | 96 | 94 | 95.9 |
| Phoslite IP-C (%) | 0.3 | 0.5 | 1 | 2 | 0.6 | 2 | 0.3 | 1 | | | |
| Perkadox 30 (%) | 0.1 | 0.1 | 0.1 | 0.1 | 0.1 | 0.1 | 0.1 | 0.1 | | | 0.1 |
| Melam. Hydrobromide (%) | 0.3 | 0.5 | 1 | 2 | 0.3 | 1 | 0.6 | 2 | 4 | 6 | 4 |
| UL 94 (3.2 mm) | nc | V2 | V2 | V2 | V2 | V2 | V2 | V2 | nc | V2 | nc |
| UL 94 (1.6 mm) | nc | V2 | V2 | V2 | V2 | V2 | V2 | V2 | nc | V2 | nc | nc = not classified according to UL 94 test

The results reported in Table 3 have been obtained utilising, as flame retardant additives, the hypophosphorous acid metal salt and the halogen containing compound (formulations 1-8), in the presence of an organic compound, able to form free radicals during flaming. Formulations 2-8 shows very good results in flame retardant effectiveness. When the hypophosphorous acid metal salt and the organic compound are not present (formulations 9-10) the amount of the halogen containing compound must be very high in order to reach a flame retardant activity. The reduction in the amount of the halogen containing compound and the absence of the hypophosphorous acid metal salt, results in a complete loss of flame retardant activity.

hydrobromide combinations. The results show the astonishing flame retardant effectiveness of the Hypophosphites/melamine hydrobromide combinations, as matter of the fact the V2 flammability level is satisfied with almost 1% w of the mixture based on Phoslite IP-C/Melamine hydrobromide, independently from the relative ratio of components (table 3), and with almost 0.6% w of the mixture based on Phoslite IP-A/Melamine hydromide (table 4) while it needs almost 6% w of melamine hydrobromide in order to reach same result (table 3 formulations 9-11).

TABLE 4

Flame retardant effectiveness of Phoslite IP-A/melamine hydrobromide in unfilled PP (homo)

| formulations | 1 | 2 | 3 | 4 | 5 | 6 | 7 | 8 | 9 | 10 | 11 |
|---|---|---|---|---|---|---|---|---|---|---|---|
| PP (homo) (%) | 99.4 | 99.2 | 99 | 98.9 | 97.9 | 95.9 | 94.9 | 99 | 96 | 95 | 99 |
| Phoslite IP-A (%) | 0.2 | 0.4 | 0.6 | 0.5 | 1 | 2 | 2.5 | 0.3 | 2 | 2.5 | 0.5 |
| Perkadox 30 (%) | 0.1 | 0.1 | 0.1 | 0.1 | 0.1 | 0.1 | 0.1 | 0.1 | | | |
| Melam. Hydrobromide (%) | 0.3 | 0.3 | 0.3 | 0.5 | 1 | 2 | 2.5 | 0.6 | 2 | 2.5 | 0.5 |
| UL 94 (3.2 mm) | V2 | V2 | V2 | V2 | V2 | V0 | V0 | V2 | V2 | V2 (*) | V2 |
| UL 94 (1.6 mm) | V2 | V2 | V2 | V2 | V2 | V2 | V2 (*) | V2 | V2 | V2 (*) | V2 |

(*) Some samples have been found to acheive the V0 classification

The results reported in Table 4 have been obtained utilising, as flame retardant additives, the hypophosphorous acid metal salt and the halogen containing compound, in the presence of an organic compound (formulations 1-8), able to form free radicals during flaming.

Tables 3 and 4 show the tested formulations based on melamine hydrobromide and Hypophosphites/melamine In the above mentioned formulations based on Hypophosphites/melamine hydrobromide mixtures, the minimum bromine content results to be around 1000 ppm.

It has been also found that Phoslite IP-A is endued with superior performance than Phoslite IP-C, as a matter of the fact it is even possible to rank V0 flammability level by adding about 4% w of the Phoslite IP-A/Melamine hydrobromide (1:1) mixture.

TABLE 5

Flame retardant effectiveness of hypophosphites/melamine hydrobromide mixtures in 20% talc filled PP

| formulations | 1 | 2 | 3 | 4 | 5 | 6 | 7 | 8 | 9 | 10 | 11 |
|---|---|---|---|---|---|---|---|---|---|---|---|
| PP (20% talc filled) (%) | 98.9 | 97.9 | 95.9 | 98.9 | 97.9 | 95.9 | 99 | 97.9 | 99 | 99 | 97.9 |
| Phoslite IP-C (%) | 0.5 | 1 | 2 | | | | 0.6 | 1.3 | 0.6 | | |
| Phoslite IP-A (%) | | | | 0.5 | 1 | 2 | | | | 0.6 | 1.3 |
| Perkadox 30 (%) | 0.1 | 0.1 | 0.1 | 0.1 | 0.1 | 0.1 | 0.1 | 0.1 | 0.1 | 0.1 | 0.1 |
| Melam. Hydrobromide (%) | 0.5 | 1 | 2 | 0.5 | 1 | 2 | 0.3 | 0.6 | 1.3 | 0.3 | 0.6 |
| UL 94 (3.2 mm) | nc | V2 | V2 | nc | V2 | V2 | nc | V2 | V2 | V2 | V2 |
| UL 94 (1.6 mm) | nc | V2 | V2 | nc | V2 | V2 | nc | V2 | V2 | V2 | V2 | nc = not classified according to UL 94 test

TABLE 6

Effectiveness of hypophosphites/melamine hydrobromide mixtures in 30% GF reinforced PP

| formulations | 1 | 2 | 3 | 4 | 5 | 6 | 7 | 8 | 9 |
|---|---|---|---|---|---|---|---|---|---|
| PP (30% GF) (%) | 98.9 | 97.9 | 95.9 | 98.9 | 97.9 | 99 | 99 | 99 | 99 |
| Phoslite IP-C (%) | 0.5 | 1 | 2 | | | 0.6 | 1.3 | | |
| Phoslite IP-A (%) | | | | 0.5 | 1 | | | 0.6 | 0.3 |
| Perkadox 30 (%) | 0.1 | 0.1 | 0.1 | 0.1 | 0.1 | 0.1 | 0.1 | 0.1 | 0.1 |
| Melam. Hydrobromide (%) | 0.5 | 1 | 2 | 0.5 | 1 | 0.3 | 0.6 | 0.3 | 0.6 |
| UL 94 (3.2 mm) | nc | V2 | V2 | V2 | V2 | V2 | V2 | V2 | V2 |
| UL 94 (1.6 mm) | nc | V2 | V2 | V2 | V2 | V2 | V2 | V2 | V2 | nc = not classified according to UL 94 test

Tables 5 and 6 show the flame retardant effectiveness of the indicated formulations as have been tested in talc filled and glass fiber reinforced PP articles.

The results show that hypophosphites/melamine hydrobromide mixtures are effective in talc filled and glass fiber reinforced articles too at the additivation level ranging from 1% to 2% w.

TABLE 7

Flame retardant effectiveness of hypophosphites/melamine hydrobromide mixtures in PP (copo)

| formulations | 1 | 2 | 3 | 4 | 5 | 6 | 7 |
|---|---|---|---|---|---|---|---|
| PP (copo) (%) | 99 | 98 | 95.9 | 98.9 | 97.9 | 99 | 99 |
| Phoslite IP-C (%) | 0.6 | 1.3 | 2 | | | | |
| Phoslite IP-A (%) | | | | 0.5 | 1 | 0.6 | 0.3 |
| Perkadox 30 (%) | 0.1 | 0.1 | 0.1 | 0.1 | 0.1 | 0.1 | 0.1 |
| Melam. Hydrobromide (%) | 0.3 | 0.6 | 2 | 0.5 | 1 | 0.3 | 0.6 |
| UL 94 (3.2 mm) | nc | V2 | V2 | nc | V2 | V2 | nc |
| UL 94 (1.6 mm) | nc | V2 | V2 | V2 | V2 | V2 | nc | nc = not classified according to UL 94 test

Table 7 shows the flame retardant effects of hypophosphites/melamine hydrobromide blends in PP copolymer as it is possible to verify that such mixtures of products are even suitable for ranking V2 flammability level with a total additivation of about 2% w on total weight of the polymer compounds.

Table 8 reports flammability test results of PP homopolymer compound made flame retarded with blends of hypophosphites/organic brominated products.

According to the above results, V2 flammability grade is satisfied with an additivation level of blends of about 0.8% w (Table 8 formulation 6); in this compound the bromine content is about 600 ppm (0.06% w), so that it will be hardly detectable with usual analytical methods.

As a comparison, the formulation 10, flame retarded with brominated organic system, needs from 2% to 2.5% wt of bromine for ranking same flammability level.

TABLE 8

Flame retardant effectiveness of Hypophosphites/brominated compounds blends in PP (homo)

| formulations | 1 | 2 | 3 | 4 | 5 | 6 | 7 | 8 | 9 | 10 |
|---|---|---|---|---|---|---|---|---|---|---|
| PP (Homo) (%) | 99 | 98 | 95.9 | 99 | 99.1 | 99.2 | 99.2 | 99.1 | 98 | 96 |
| Phoslite IP-C (%) | 0.6 | 1.3 | 2 | | | | | | 1.3 | |
| Phoslite IP-A (%) | | | | 0.6 | 0.6 | 0.6 | 0.5 | 0.6 | | |
| Perkadox 30 (%) | 0.1 | 0.1 | 0.1 | 0.1 | 0.1 | 0.1 | 0.1 | 0.1 | 0.1 | |
| PE 68 (%) | 0.3 | 0.6 | 2 | 0.3 | 0.2 | 0.1 | 0.2 | | | |
| PB 370 (%) | | | | | | | | 0.2 | 0.6 | |
| Org. brom. System (%) (*) | | | | | | | | | | 4 |
| UL 94 (3.2 mm) | nc | V2 | V2 | V2 | V2 | V2 | V2 | V2 | V2 | V2 |
| UL 94 (1.6 mm) | nc | V2 | V2 | V2 | V2 | V2 | V2 | V2 | V2 | V2 | nc = not classified according to UL 94 test; Org. Brom. System = PE68/Sb2O3 (3/1)

TABLE 9

Flame retardant effectiveness of hypophosphites/brominated compounds blends in PP (copo)

| formulations | 1 | 2 | 3 | 4 | 5 |
|---|---|---|---|---|---|
| PP (copo) (%) | 97.9 | 95.9 | 99 | 97.9 | 97.9 |
| Phoslite IP-C (%) | 1.3 | 2 | | | |
| Phoslite IP-A (%) | | | 0.6 | 1.3 | 1.3 |
| Perkadox 30 (%) | 0.1 | 0.1 | 0.1 | 0.1 | 0.1 |
| PE 68 (%) | 0.7 | 2 | 0.3 | 0.7 | |
| PB 370 (%) | | | | | 0.7 |
| UL 94 (3.2 mm) | nc | V2 | nc | V2 | V2 |
| UL 94 (1.6 mm) | nc | V2 | nc | V2 | V2 | nc = not classified according to UL 94 test

Table 9 reports some flammability test results of PP copolymer compounds flame retarded with the use of mixtures based on hypophosphites and organo-brominated compounds. We have found that these blends are effective in flame proofing PP copolymer articles too.

The invention claimed is:

1. A thermoplastic moulding composition that consists of: components A, B, C and D that are:
   A. from 65% to 99.5% by weight of a polyolefinic polymer;
   B. from 0.1% to 35%, of a synergistic mixture of:
      at least an hypophosphorous acid metal salt having the following general formula $(PH_2O_2)_n Me$ where:
      n is an integer number ranging from 1 to 4 in dependence upon the valence of the metal Me,
      Me is any atom belonging to the groups I, II, III and IV of the periodic table of the elements and
      at least a halogenated organic compound;
   C. from 0.5% to 10% by weight of a plurality of selected additives; and
   D. from 0 to 60% by weight of an inorganic filler,
   provided that a total of the percentages by weight of components A to D is 100%.

2. The thermoplastic moulding composition according to claim 1, wherein component B is between 0.5% to 25% by weight.

3. The thermoplastic moulding composition according to claim 1, wherein said hypophosphorous acid metal salt is selected from the group consisting of salts of sodium, calcium, magnesium, zinc, tin and aluminium.

4. The thermoplastic moulding composition according to claim 1, wherein said polyolefinic polymer is selected from the group consisting of polymers derived from propylene, ethylene, butene, isobutene, pentene, hexene, heptene, octene, 2-methyl propene, 2-methylbutene, 4-methyl pentene, 4-methyl hexene, 5-methylhexene, butadiene, pentadiene, hexadiene, isoprene, 2,3-dimethylbutadiene, vinyl ciclohexene, cyclopentadiene, styrene, methyl styrene, corresponding copolymers, copolymers containing an olefinic carboxylic acid or anhydride or ester selected from the group consisting of acrylic acid, maleic anhydride, vinyl acetate, homopolymer blends, copolymer blends and homopolymer-copolymer blends.

5. The thermoplastic moulding composition according to claim 1, wherein said halogen containing compound is selected among decabromo diphenyl oxide, hexabromocyclododecane, ethylene bistetrabromophthalimide, tris (tribromoneopentyl)phosphate, adducts of hexachloropentadiene and cyclo octadiene, tetrabromo bis phenol A bis(2,3-dibromopropyl ether).

6. The thermoplastic moulding composition according to claim 5, wherein said halogenated organic compound is melamine hydrobromide.

7. The thermoplastic moulding composition according to claim 1, wherein the weight ratio of said hypophosphorous acid metal salt on said halogenated organic compound ranges from 6 to 1/6.

8. The thermoplastic moulding composition according to claim 1, wherein the average particle size (D50%) of the hypophosphorous acid metal salt is lower than 40 μm and the highest particle size is below 100 μm.

9. The thermoplastic moulding composition according to claim 1, wherein said halogenated organic compound is selected among: 2,3-dimethyl 2,3-diphenyl butane, 2,3-dimethyl 2,3-diphenylhexane poly(1,4-diisopropyl benzene).

10. The thermoplastic molding composition according to claim 1, wherein said halogenated organic compound is in an amount of between 0.01% to 1% wt on the weight of the total.

11. The thermoplastic moulding composition according to claim 10, wherein said halogenated organic compound is in an amount of between 0.05% and 0.5% wt on the weight of the total.

12. The thermoplastic moulding composition according to claim 1, wherein said additives are selected among: heat stabilisers, UV stabilisers, lubricants, mould releasing agents, colorants, antidripping agents, nucleating agents, antiacid components.

13. The thermoplastic moulding composition according to claim 12, wherein said additives are used as such or in mixture in a amount ranging from 0.5% to 10% wt on the weight of final products.

14. The thermoplastic moulding composition according to claim 1, wherein the inorganic filler is selected from group consisting of fibrous or particulate substances.

15. A process for the preparation of a thermoplastic moulding composition according to claim 1, comprising the step of mixing and kneading said starting components in a predetermined ratio at a temperature between 160° C. and 230° C., cooling and pelletizing the extrudates, moulding the resulting pellets.

16. A process of use of the thermoplastic composition according to claim 1 for the preparation of moulded articles.

17. Moulded articles obtained using the thermoplastic composition according to claim 1.

18. A process of use of the moulded articles according to claim 17 for applications in the electrical and electronic sectors, parts for office automation appliances, lamp parts, plugs and multipoint connectors, wire and cables, relay housings, pipes, in building and construction applications.

19. The thermoplastic molding composition of claim 3, wherein said hypophosphorous acid metal salt is selected from the group consisting of aluminium and calcium hypophosphite.

20. The thermoplastic molding composition of claim 4, wherein said polyolefinic polymer is selected from the group consisting of polypropylene including atactic-, syndiotactic- and isotactic-polypropylene, polyethylene including low density, high density, linear low density and block and random copolymers of ethylene and propylene.

21. The thermoplastic molding composition according to claim 7, wherein the weight ratio of said hypophosphorous acid metal salt on said halogenated organic compound ranges from 3 to 1/3.

22. The thermoplastic molding composition according to claim 8, wherein the average particle size (D50%) of the hypophosphorous acid metal salt is below 15 µm and the highest particle size is below 30 µm.

23. The thermoplastic molding composition according to claim 14, wherein the particulate substance is up to 30% by weight.

24. The thermoplastic molding composition according to claim 23, wherein the particulate substance is up to 20% by weight.

* * * * *